United States Patent
Waugh

(10) Patent No.: US 8,887,434 B2
(45) Date of Patent: Nov. 18, 2014

(54) SYSTEM FOR HARVESTING MARINE SPECIES MEMBERS INCLUDING THOSE THAT PRESENT A DANGER TO A HARVESTER

(75) Inventor: Gregg Waugh, Walterboro, SC (US)

(73) Assignee: SeaSolutions LLC, Walterboro, SC (US)

( * ) Notice: Subject to any disclaimer, the term of this patent is extended or adjusted under 35 U.S.C. 154(b) by 0 days.

(21) Appl. No.: 13/382,444

(22) PCT Filed: Jul. 5, 2010

(86) PCT No.: PCT/US2010/041005
§ 371 (c)(1),
(2), (4) Date: Jan. 5, 2012

(87) PCT Pub. No.: WO2011/005723
PCT Pub. Date: Jan. 13, 2011

(65) Prior Publication Data
US 2012/0102811 A1 May 3, 2012

Related U.S. Application Data

(60) Provisional application No. 61/223,214, filed on Jul. 6, 2009, provisional application No. 61/322,876, filed on Apr. 11, 2010.

(51) Int. Cl.
| | | |
|---|---|---|
| A01K 81/04 | (2006.01) | |
| A01K 77/00 | (2006.01) | |
| A01K 97/20 | (2006.01) | |
| F41B 13/10 | (2006.01) | |

(52) U.S. Cl.
CPC ............. *A01K 81/04* (2013.01); *A01K 77/00* (2013.01); *A01K 97/20* (2013.01); *F41B 13/10* (2013.01)
USPC .............................................. 43/6

(58) Field of Classification Search
USPC ................ 43/5, 6; 294/61, 182, 126–130
IPC .................................. A01K 81/00,81/04, 81/06
See application file for complete search history.

(56) References Cited

U.S. PATENT DOCUMENTS

| | | | | |
|---|---|---|---|---|
| 1,801,084 A | * | 4/1931 | Huie | 30/129 |
| 2,607,150 A | * | 8/1952 | Taylor | 43/6 |
| 2,804,336 A | * | 8/1957 | Thompson | 294/61 |
| 3,004,362 A | * | 10/1961 | Day | 43/6 |

(Continued)

OTHER PUBLICATIONS

Fishspearit, Inc. "Foldspears" (accessed Jan. 25, 2012), at http://www.foldspear.com/store/index.php?main_page=index&cPath=6&zenid=e151097b57c4deee9908e79159f15706.
Reef Protection Inc. "ELF (Patent Pending) Details" (accessed Jan. 25, 2012), at http://www.reefprotectioninc.com/ELFDetails.aspx. ("(C) 2009-2012.").
AcuSpear "The Reef Defender: A Precision, Non-Projectile Lionfish Spear" (accessed Jan. 25, 2012), at http://www.acuspear.com/reef-defender-lionfish-spear. ("(C) 2010"). (Webpage showing images.).

(Continued)

*Primary Examiner* — Darren W Ark
*Assistant Examiner* — Thien Thanh Pham
(74) *Attorney, Agent, or Firm* — Thrive IP; Jeremy M. Stipkala

(57) ABSTRACT

Devices, methods, and systems are disclosed for harvesting a member of a marine species while minimizing or preventing contact between the harvester and the marine species. Certain embodiments reduce the opportunity for contact between the harvester and the harvested member by providing mechanical means for removing the harvested member from a spear. The invention method includes, in one case, the steps of impaling the marine species member, removing the member from the impaling device, and securing the removed member in a manner to prevent contact with the harvester during each step of the method.

10 Claims, 7 Drawing Sheets

(56) References Cited

U.S. PATENT DOCUMENTS

| | | | |
|---|---|---|---|
| 4,335,678 A * | 6/1982 | Garza et al. | 294/1.5 |
| 4,498,190 A * | 2/1985 | Garlick, III | 383/28 |
| 4,896,450 A | 1/1990 | Rogers | |
| 5,050,535 A | 9/1991 | McKellar et al. | |
| 5,212,902 A | 5/1993 | Moorhead et al. | |
| 5,642,911 A * | 7/1997 | Gatch | 294/61 |
| 6,050,626 A * | 4/2000 | Dudley | 294/61 |
| 6,484,432 B1 * | 11/2002 | Walger, Jr. | 43/6 |
| 6,662,488 B1 * | 12/2003 | Heimbrock et al. | 43/55 |
| 6,772,554 B1 | 8/2004 | Boone | |
| 6,883,264 B1 * | 4/2005 | Gimbel | 43/6 |
| 7,017,297 B1 | 3/2006 | Ward | |
| 7,104,577 B1 * | 9/2006 | Berke | 294/61 |
| 2004/0173197 A1 | 9/2004 | Moffitt | |

OTHER PUBLICATIONS

AcuSpear "The Reef Defender: A Precision, Non-Projectile Lionfish Spear" (accessed Jan. 25, 2012), at http://www.acuspear.com/reef-defender-lionfish-spear. ("(C) 2010"). (Text file.).

"The Frapper" (accessed Jan. 25, 2012), at http://www.thefrapper.com/.

Armor Products Manufacturing, Inc. "Bait Bags, Catch Bags and Fisheries Products" (accessed Jan. 25, 2012), at http://www.armorbags.com/baitbags.htm. ("Copyright (C) 2006.").

International Preliminary Report on Patentability, PCT Application No. PCT/US2010/041005 (Jan. 10, 2012).

International Search Report and Written Opinion for PCT/US2010/041005, dated Feb. 24, 2011 (11 pages).

* cited by examiner

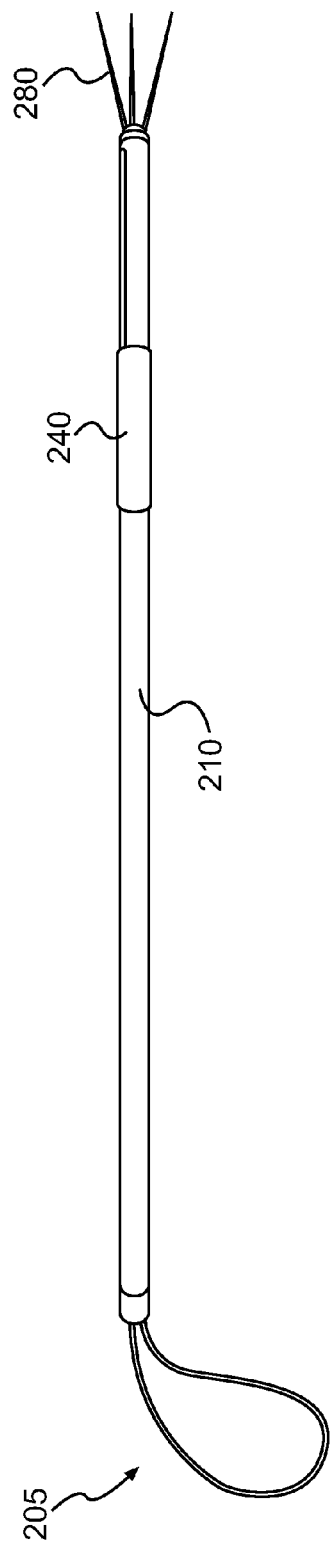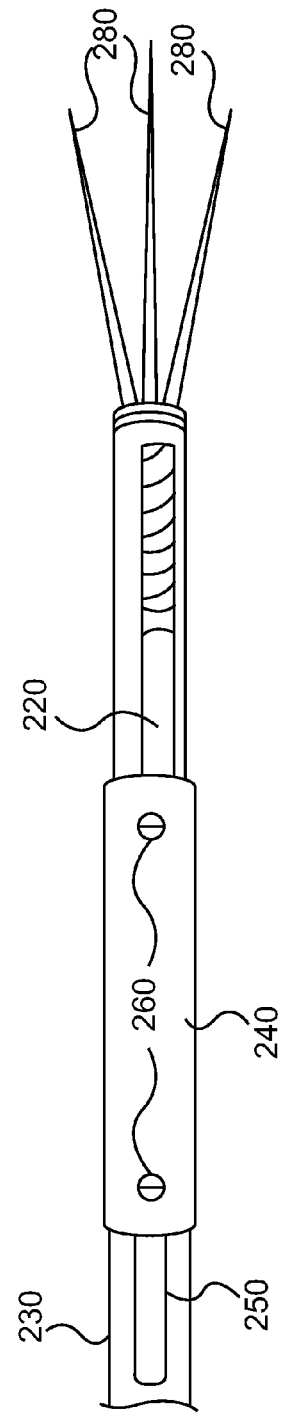
FIG. 2a
FIG. 2b

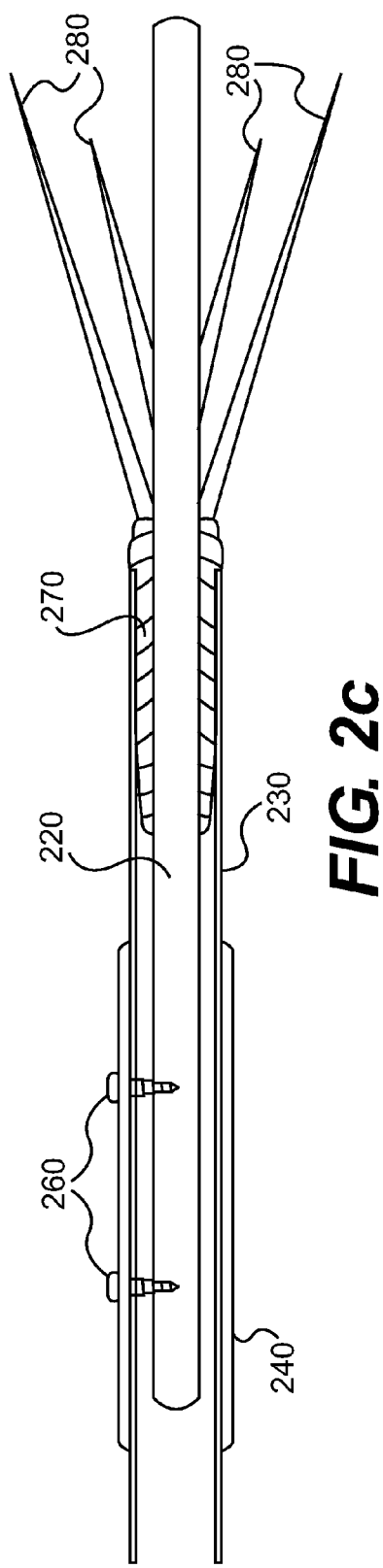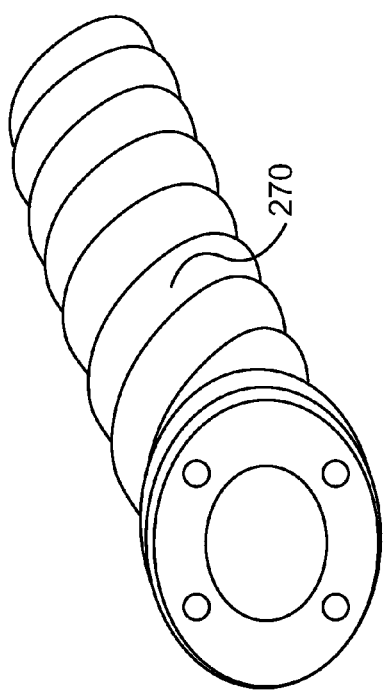
FIG. 2c
FIG. 2d

SYSTEM FOR HARVESTING MARINE SPECIES MEMBERS INCLUDING THOSE THAT PRESENT A DANGER TO A HARVESTER

CROSS REFERENCE TO RELATED APPLICATIONS

This application claims benefit of priority to U.S. Provisional Patent Application No. 61/223,214, entitled, "A System for Harvesting Marine Species Members that Present a Danger to a Harvestor [sic]," filed Jul. 6, 2009; and U.S. Provisional Patent Application No. 61/322,876, entitled, "System for Harvesting Marine Species Members that Present a Danger to a Harvester," filed on Apr. 11, 2010; both applications are incorporated herein by reference in their entirety.

TECHNICAL FIELD

The invention resides in the field of marine environmental protection. More particularly, the invention relates to protecting indigenous marine plant and animal species from the uncontrolled introduction of a new (therefore non-indigenous) species or rapid, uncontrolled population growth of indigenous species. Most particularly, the invention permits a controlled removal of said species as a means for protecting indigenous plant and animal life in the affected marine environment.

BACKGROUND ART

The invention of this application was created in response to recent developments wherein aggressive harvesting of one or more marine species may be deemed necessary to protect a marine environment/ecosystem wherein the harvested marine species could cause serious harm to the harvester by contact. At least two marine species have been identified that could pose such a danger. Use of state of the art marine harvesting equipment does not adequately protect a harvester from such a danger.

The more well known (to those in the art) of a marine species member that poses such a danger to a harvester is the lionfish. Lionfish represent an invasive species that is rapidly expanding throughout the coastal Southeastern United States and the Caribbean as a result of a relatively recent accidental introduction into the Atlantic and Caribbean oceans of this species of fish that had not been found previously in said oceans. It is a species native to the Indo-Pacific Ocean and Red Sea, and the venom from the spines is very poisonous. Its presence in its new environment is causing a rapid reduction of the number of indigenous species that fall into the size range of fish it preys upon, and the absence of its natural predators is simultaneously causing a dramatic increase in the numbers of its own species. If this combination of factors continues, great harm will be done to this marine environment that may never be corrected.

Aside from the rapid and immediate mortality of marine life, the loss of herbivorous fish also sets the stage for seaweeds to potentially overwhelm the coral reefs and disrupt the delicate ecological balance in which those reefs exist, according to scientists from Oregon State University (Oregon State University (2008, Jul. 21). "Lionfish Decimating Tropical Fish Populations, Threatening Coral Reefs" in *ScienceDaily*). The lead author is Mark Albins, a doctoral student working with Mark Hixon. They report that following on the heels of overfishing, sediment depositions, nitrate pollution in some areas, coral bleaching caused by global warming, and increasing ocean acidity caused by carbon emissions, the lionfish invasion is a serious concern.

The study is the first to quantify the severity of the crisis posed by this invasive species, which is native to the tropical Pacific and Indian Oceans and has few natural enemies to help control it in the Atlantic Ocean. It is believed that the first lionfish—a beautiful fish with dramatic coloring and large, spiny fins—was introduced into marine waters off Florida in the early 1990s from local aquariums or fish hobbyists. They have since spread across much of the Caribbean Sea and north along the United States coast as far as Rhode Island.

The problem is magnified in that these fish eat many other species, and they seem to eat constantly. In studies on controlled plots, the OSU scientists determined that lionfish reduced young juvenile fish populations by 79 percent in only a five-week period. Many species were affected, including cardinalfish, parrotfish, damselfish and others. One large lionfish was observed consuming 20 small fish in a 30-minute period.

Lionfish are carnivores that can eat other fish up to two-thirds their own length, while they are protected from other predators by long, venomous spines. In the Pacific Ocean, the authors report, other fish have learned to avoid them, and lionfish also have more natural predators, particularly large groupers. In the Atlantic Ocean, native fish have never seen them before and have no recognition of danger. In their recent habitat, about the only thing that will eat lionfish is another lionfish—they are not only aggressive carnivores but also cannibals. It was reported that in the Caribbean few local predators eat lionfish, so there appears to be no natural controls on them. Moreover, they feed in a way that no fish indigenous to the Atlantic Ocean has ever encountered. When attacking another fish, the lionfish will use its large, fan-like fins to herd smaller fish into a corner and then swallow them in a rapid strike. Because of their natural defense mechanisms they are afraid of almost no other marine life. And the poison released by their sharp spines can cause extremely painful stings to humans—even leading to fatalities for some people with heart problems or allergic reactions.

Their rapid reproduction potential must be understood in context with their ability to seriously depopulate coral reef ecosystems of other fish. Parrotfish and other herbivores prevent seaweeds from smothering corals. A major, invasive predator such as lionfish could disrupt the entire ecosystem.

Individual collection is mentioned as one way to address the problem. This, of course, would be more effective if a market developed for lionfish as a food, providing a monetary motivation for their collection. Currently, there is no polespear/spear gun designed to harvest lionfish in a safe and efficient manner. Available harvesting equipment places the harvester in danger of coming into contact with the poisonous venom from the lionfish dorsal, anal, and ventral spines during the harvesting process. Thus, there are no polespears or spear guns specifically adapted to capture/kill lionfish while minimizing potential risk to the harvester. Any of the models currently available could be used to spear a lionfish, but they are not adapted to remove the fish from the spear or polespear without getting stuck and seriously injured by a spine.

The present invention provides a means for successfully harvesting lionfish, and any other similarly threatening species, while avoiding said danger.

A second species that poses a threat to a harvester is the crown-of-thorns starfish (*Ancanthaster planci*). For example, the Philippine Headline News Online reported on Apr. 5, 2007, "a 'massive outbreak' of coral-eating starfish in various parts of the country, as the temperature continues to rise and tourists flock to different beaches nationwide." It was further reported that "The World Wildlife Fund for Nature-Philippines (WWF) said that the rash of the coral-eating crown-of-thorns starfish has been detected in many Philippine reefs, including those in Mabini, Batangas; Apo Reef off the Dumaguete coast; Puerto Galera in Mindoro; Roxas in Palawan; Bolinao in Lingayen Gulf; and Kiamba and Glan in Sarangani Bay."

WWF-Philippines media officer Gregg Yan explained that "a serious infestation" of the crown-of-thorns starfish can destroy entire sections of coral reefs in weeks. He said that a single crown-of-thorns starfish can consume six meters of healthy reef annually. Department of Environment and Natural Resources (DENR) Protected Areas and Wildlife Bureau (PAWB) director Dr. Mundita Lim said, "they will mobilize divers to help remove the crown-of-thorns starfish from the affected reefs." According to Lim, the invasion of the crown-of-thorns starfish occurs when there is disturbance on the marine ecosystem brought about by rising temperature or global warming, the El Niño phenomenon, or organic pollution.

WWF warned against touching the crown-of-thorns starfish with one's bare hands and cautioned the public to "be extremely careful" in handling the starfish. WWF president Lorenzo Tan said the long spines of the crown-of-thorns starfish can deliver severe stings and that bare-handed contact will almost surely inflict severe swelling, pain and nausea that can last from hours to days. The crown-of-thorns starfish produces a neurotoxin which can be released through its spines. Not only are the wounds themselves serious, but the neurotoxin can cause a sharp stinging pain that can last for hours, as well as nausea and vomiting.

"Normally, reefs should be left alone to deal with unusual occurrences such as this," Yan said. "However, the situation facing the country's reefs is far from normal." According to the WWF, the Philippines once had 25,000 square kilometers of coral reef A recent World Bank study revealed that barely one percent of the country's reefs remain pristine, while over 50 percent of the country's reefs are unhealthy.

The Great Barrier Reef of the northeast coast of Australia is also a victim of the crown-of-thorns starfish. Experts suggest that parts of the reef could be as much as 18 million years old, but most of the coral visible today has only developed over the past 2 million years. As a result, it is an irreplaceable resource and one of the world's greatest natural assets. It is available for the use and enjoyment of all people, but the crown-of-thorns starfish threatens this natural resource. This animal is also the largest starfish in the world. People have sighted ones as big as 700 mm in diameter from one tip to the other. The normal size for this starfish is between 250 mm and 350 mm. Adult starfish have few predators because of their tough and toxic "skin" and long spines. There is little evidence of any major diseases in crown-of-thorns starfish. This starfish is quite beautiful when it is seen in its natural environment, as it is multi-colored ranging from purplish white tip spines to having a green body with yellow tip spines. When the crown of thorns starfish is present in large numbers, they often eat together in groups called aggregations. In recent years crown-of-thorns aggregations have caused large-scale coral destruction in other areas of the Pacific but especially in the Great Barrier Reef.

There may be other marine species members that may be causing or may yet cause harm to the environment and that, if harvesting becomes necessary, may pose a danger to the harvester. The disclosed invention will permit such harvesting in a safe manner and without the need for contact between the marine species member and the harvester. Of course, embodiments of the present invention can be used to harvest animals of other species, even when the animal poses less, little, or no threat to the harvester. For example, some fishermen such as children prefer not to contact their catch, and desire to use other means to handle their catch besides their hands.

There are a number of spear guns, polespears and Hawaiian slings on the market used for harvesting a variety of marine species. Spear guns can be classified into two distinct types, namely pneumatic (air) guns and band guns. Each type has its own advantages and disadvantages. Band guns can be further sub-divided into a myriad of categories. Primarily there are euro guns (used for hunting smaller fish), multiple band wooden guns, and hybrids. More divers are now using pneumatic guns, and it seems like their popularity will increase. For the purposes of this disclosure, the term "spear" shall be used to refer to either a polespear or a spear ejected from a spear gun or Hawaiian sling.

An example of a multi-section polespear is shown in FIGS. 1a and 1b.

BRIEF DESCRIPTION OF DRAWINGS

FIG. 2a represents a perspective view of an embodiment of the invention polespear as used in the invention system for harvesting marine species members that may pose a danger from contacting the harvester with at least one invention adaptation shown near the forward end of the polespear.

FIG. 2b represents a different perspective view of the invention adaptation of the polespear of FIG. 2a showing the plunger within the polespear and the handle that operates the plunger along the slot in the polespear that permits movement of the fasteners of the handle onto the plunger.

FIG. 2c represents a cross-sectional view of the invention polespear showing the operation of the plunger within the polespear barrel.

FIG. 2d represents a perspective view of a guide for the plunger as it exits the barrel to stabilize its movement to push the harvested marine species member off the spear tips and into the bag container.

DISCLOSURE OF THE INVENTION

Figure 1A:
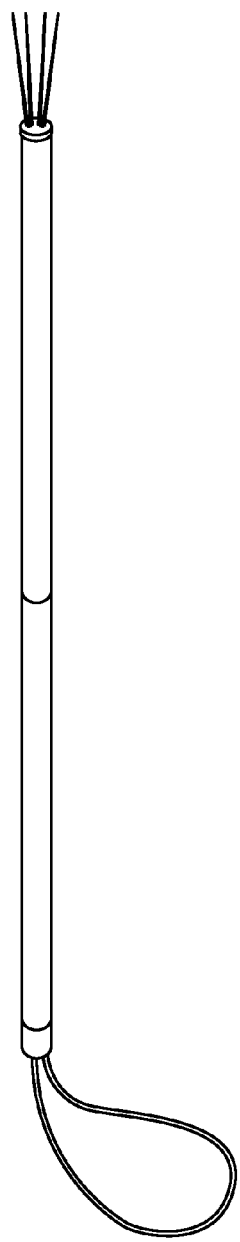
FIG. 1a represents a perspective view of a state of the art polespear as used to harvest a marine species member.

As required, detailed embodiments of the present invention are disclosed herein; however, it is to be understood that the disclosed embodiments are merely exemplary of the invention that may be embodied in various forms. The figures are not necessarily to scale, and some features may be exaggerated to show details of particular components. Therefore, specific structural and functional details disclosed herein are not to be interpreted as limiting, but merely as a basis for the claims and as a representative basis for teaching one skilled in the art to variously employ the present invention.

A system other than an ecosystem, according to the present invention, relates to one or more pieces of equipment used to harvest a member of a marine species in a manner that reduces or eliminates contact between a harvester and the member. A system can comprise a spear, in some embodiments. In other embodiments, a system comprises a spear and a container adapted to retain a harvested member. In still other embodiments, a system comprises a container. Spears, containers, other pieces of equipment, and other further embodiments of the present invention are described in more detail herein.

While suitable for use against any marine species member, the invention spear was specifically developed to harvest venomous species, such as the lionfish, while at the same time protecting the harvester. This involves a redesign of the spear tip and the end of the polespear so that a shielding device, such as a "plunger" would permit pushing the lionfish off the spear without any hand contact with the lionfish. In addition, the lionfish could be put (e.g., pushed or pulled) into a protective container, such as a heavy canvas bag (to prevent the spines from sticking a harvester) with a "one-way" top that prevents escape. One embodiment of the invention polespear is shown in FIGS. 2a-2d.

FIG. 2a represents a perspective view of an embodiment of the invention polespear 210 as used in the invention system for harvesting marine species members that may pose a danger from contacting the harvester with one aspect of the invention adaptation shown near the forward end of the polespear. Loop 205 comprises an elastic material such as a large band or tubing made of rubber so the harvester can both launch and retain the polespear 210. When the polespear 210 is thrust or launched at a target such as a lionfish, the tines 280 impale the fish. Then the harvester can move handle 240 which moves a plunger (not shown) to remove the impaled fish while reducing the chance that the impaled fish will contact the harvester.

FIG. 2b represents a different perspective view of the invention adaptation of the polespear 210 of FIG. 2a showing the plunger 220 within the polespear barrel 230 and the handle 240 that operates the plunger 220 along the slot 250 in the polespear barrel 230 that permits movement of the fasteners 260 that connect the handle 240 with the plunger 220. Tines 280 also appear, to indicate the forward end on the polespear 210. In FIG. 2b, the plunger 220 is in a retracted position.

FIG. 2c represents a cross-sectional view of the invention polespear showing the operation of the plunger 220 within the polespear barrel 230 and out of the barrel 230 via a stabilizing guide 270 located at the end of the barrel 230. When the harvester moves handle 240 toward the tines 280, the plunger 220 moves along barrel 230, through the stabilizing guide 270, and among the tines 280. If a fish or other marine species member is impaled on the tines 280, the plunger 220 is thus adapted to push the fish or member off the tines 280.

FIG. 2d represents a perspective view of a stabilizing guide 270 for the plunger (not shown) as it exits the barrel (not shown) to stabilize the movement of the plunger (not shown) to push the harvested marine species member off the tines (not shown) and into a bag container, for example. As seen in FIG. 2c, the stabilizing guide 270 resides inside the polespear barrel 230, in the embodiment shown. In other embodiments, one or more stabilizing guides can be positioned and attached in any suitable manner, such as, for example, inside the polespear barrel, attached to the end of the polespear barrel, and combinations thereof Attachment can be through any suitable means, such as friction, tab-slot design, adhesive, one or more fasteners such as screws, bolts, or rivets, and combinations thereof. Tab-slot design means that a stabilizing guide has a tab or other structure that couples to a slot or other structure on the barrel, or vice versa, so the two parts are mechanically coupled.

Thus, some embodiments of the present invention comprise a spear for harvesting a marine species member that presents a danger to a harvester from contact with the marine species member, wherein the spear comprises at least one shielding device adapted to remove said marine species member from the spear without direct contact between the marine species member and the harvester. In some cases, the spear is chosen from a polespear, a spear ejected from a spear gun, and a spear ejected from a Hawaiian sling. The spear can comprise a single spear point, or multiple tines. For example, the spear can employ one, two, three, four, five, or more tines, in some embodiments.

Figure 1B:
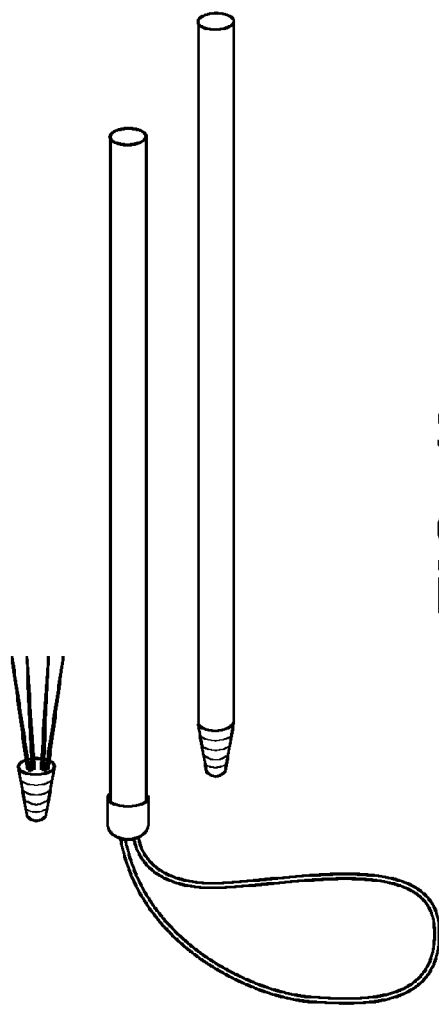
FIG. 1b represents a perspective view of a state of the art polespear as broken down into its parts for storage or transport.

The parts of the spear can be made of any suitable material arranged in any suitable configuration. In one embodiment, a spear shaft can be constructed in two parts. The first part, housing the spear tips or tines at one end and the shielding mechanism such as a plunger or disc, can be made of aluminum tubing having 5/8" outside diameter and 3/8" inner diameter. The second part of the spear shaft, the end to which the rubber band is attached, can be made from solid aluminum rod such as 6061 Aluminum having 5/8" outer diameter. The rubber band employed at the end of the polespear of FIG. 2 can be the same as used by any number of polespears on the market. The invention lies in adaptations made in the pole (to house the plunger) and the spear end, among other aspects. In some embodiments, the spear tips or tines are splayed as shown in FIGS. 1 and 2. In other embodiments, the spear tips or tines are substantially parallel with each other. In still further embodiments, the spear tips or tines are arranged in a combination of splayed and substantially parallel.

1. Spear tip—While the invention can operate successfully with a single spear point, in one embodiment there are multiple tips (or "tines") with or without a small barb on each spear tip, such as might be found on a frog gig. This configuration would allow a plunger to operate through the middle of the spear point assembly. Alternatively, multiple tines could be used, and a disc could be used to push the harvested marine species member off the end of a polespear, whereby the disc passes along the outside of the spear point assembly. In another embodiment, the energy for forcing the plunger or disc forward to accomplish removal of the marine species member could come from the release of a compressed spring attached at the rear end of the plunger or disc assembly. The spear tips or tines can be made of any suitable material, such as, for example, stainless steel.

2. Plunger—This apparatus can be mounted either on the outside of the shaft (via eye bolts, for example) or inserted into the hollow part of the polespear and operate through a slot along the barrel of the polespear. The plunger would push the harvested marine species member off the end of the spear as the plunger is moved towards the tip. The handle portion for guiding the plunger forward would need to be large enough for the harvester to push while wearing dive gloves, in some embodiments. The forward end of the plunger could either comprise a disc that the spear tines go through or it could have a blunt tip that comes out through the center of the tines, for example. The shielding device such as a plunger or disc can operate through the middle of the spear point assembly, along the outside, or a combination thereof In some embodiments, the handle for operating a center-mounted plunger is made of plastic, metal, or wood, and the plunger itself is a suitable plastic, wood, or metal rod having an outer diameter less than the inner diameter of the spear shaft tubing. In FIGS. 2*c* and 2*d*, a stabilizing guide 270 is shown attached to the spear barrel 230 to guide the plunger 220 out of the spear barrel 230 towards the harvested member (not shown). A stabilizing guide such as stabilizing guide 270 can be made of any suitable material, such as plastic, wood, or metal, or a combination thereof In one embodiment, the stabilizing guide 270 comprises polytetrafluoroethylene (Teflon®).

3. Dive Bag—A specialized dive bag, for example made of a woven material such as dense canvas, is a very effective accessory and is an element of some embodiments of the invention system. Also, a woven, open-patterned material made from a synthetic material would be suitable for a salt-water environment. Any open-mesh material should be sufficiently tightly woven to retain all venomous spines of a target marine species so they do not poke through the material of the bag, in some embodiments. In general, the dive bag can be made of any suitable material or combinations of materials. In addition to canvas, polymers such as polyethylene, polypropylene, polyesters, polycarbonates, polyvinyl chloride, and polyamides, among others, can be used, either as woven or non-woven. In some embodiments, a clear, flexible, durable polymer is cast, sewn, or fused in the form of a bag, and one or more desired closure mechanisms, handles, artistic designs, and the like are attached.

Figure 3A:
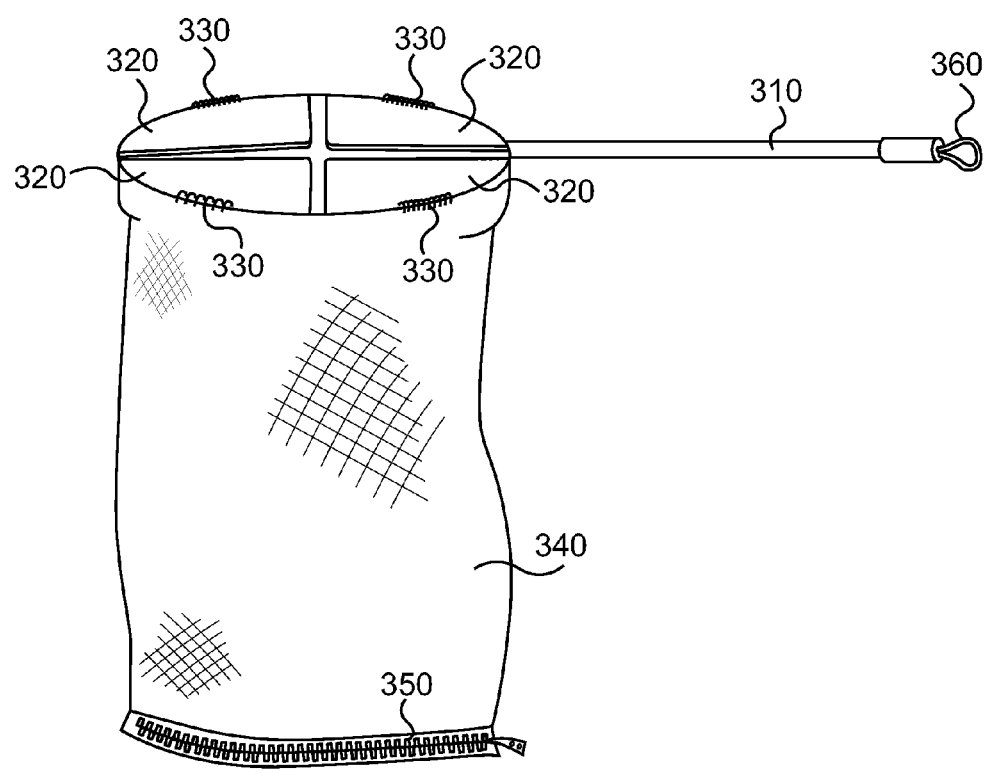
FIG. 3a represents a perspective view of an embodiment of the bag container showing a generally circular first opening with a first opening closure provided by partitions in the general shape of quadrants of the shape of the first opening hinged along the edge of the first opening.
Figure 3B:
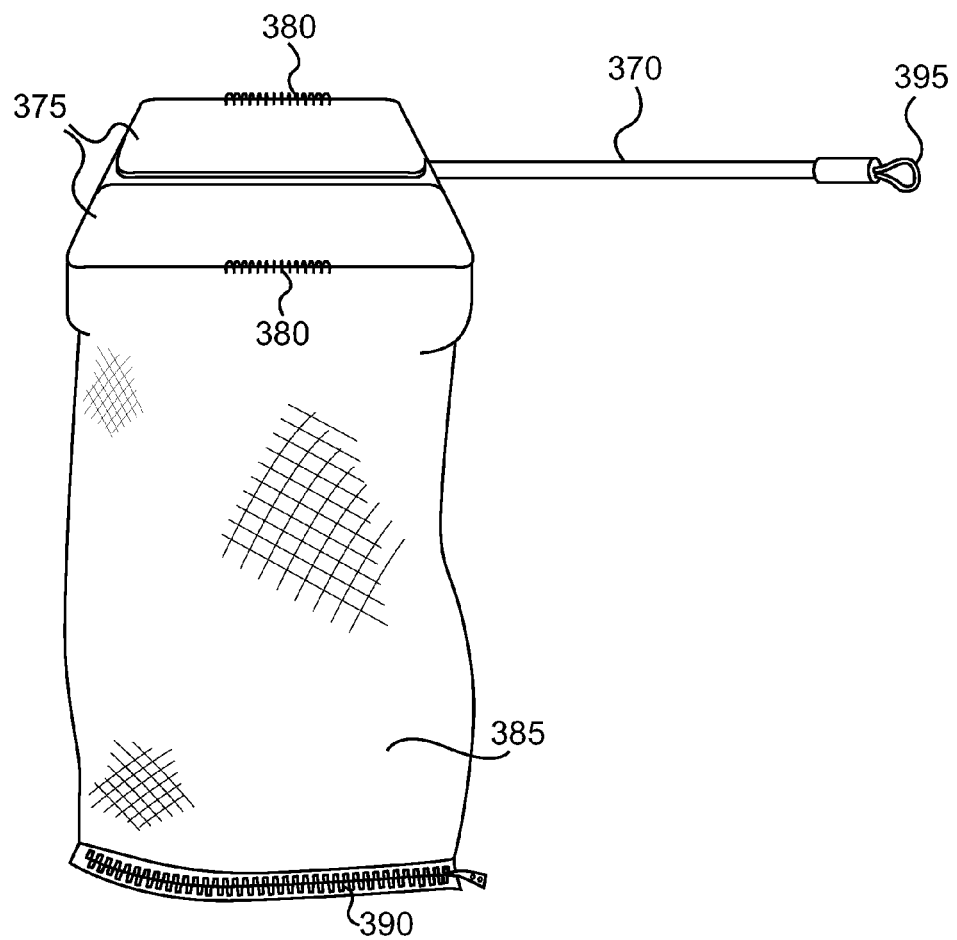
FIG. 3b represents a perspective view of an embodiment of the bag container showing a rectilinear-shaped (in this instance, a square) closure for the first opening, formed by rectilinear-shaped (in this instance, non-equilateral rectangles) partitions of a size to fill the first opening and hinged along two opposing edges of the first opening.

FIGS. 3*a* and 3*b* show dive bag embodiments having the following features:

FIG. 3*a* represents a perspective view of an embodiment of a bag 340 showing a handle 310 with a loop of cord 360 for ease of securing the bag 340. The handle 310 also defines a generally circular first opening with a first opening closure provided by partitions 320 in the general shape of quadrants. In some embodiments, the handle 310 and the first opening can be formed of the same material as described, while in other embodiments, the first opening can be formed of one or more individual pieces and the handle 310 attached thereto. The partitions 320 are arranged in the shape of the first opening and attached by hinges 330 along the edge of the first opening so that the partitions can open into the bag 340 but cannot swing above the plane of the first opening. Thus, the partitions 320 are adapted to retain a harvested marine species member inside the bag 340, or even to aid in the removal of a harvested member from a spear (not shown). The bag 340 is attached to the first opening defined by the handle 310, and also comprises a second opening in the form of a zipper 350 distal from the first opening. The bag 340 shown in FIG. 3*a* can be any suitable material; a heavy canvas is depicted.

FIG. 3*b* represents a perspective view of another embodiment of a bag 385 showing a handle 370 defining a rectilinear shape (in this instance, a square) for the first opening, comprising rectilinear-shaped (in this instance, rectangles) partitions 375 of a size to fill the first opening and attached by hinges 380 along two opposing edges of the first opening defined by handle 370. In some embodiments, the handle 370 and the first opening can be formed of the same material as described, while in other embodiments, the first opening can be formed of one or more separate pieces and the handle 370 attached thereto. The partitions 375 are arranged in the shape of the first opening and attached by hinges 380 along the edge of the first opening so that the partitions can open into the bag 385 but cannot swing above the plane of the first opening. Thus, the partitions 375 are adapted to retain a harvested marine species member inside the bag 385. The bag 385 is attached to the first opening defined by the handle 370, and also comprises a second opening in the form of a zipper 390 distal from the first opening. The bag 385 shown in FIG. 3*b* can be any suitable material; a heavy canvas is depicted.

While FIGS. 3*a* and 3*b* present embodiments of the container described in the appended claims, the claimed invention also includes a container of the following description:

(1) Made of a material suitable to prevent penetration of venomous spines (a heavy, dense canvas, or other such material can be used);

(2) Optionally contains a clip-ring to clip onto a dive belt at the diver's end of a handle for maneuvering the bag;

(3) A rigid or semi-rigid rim forming a first opening in any shape and size permitting insertion of a harvested marine species member (e.g., round, square, oval, or, depending on degree of rigidity, a changing or an undefined shape) with partitions shaped to fill the opening of the top of the bag container where the partitions are attached to the edge of the top opening to permit only limited movement of the individual partitions to facilitate insertion of a harvested lionfish (or other marine species member) but prevent its escape through said opening; and (4) A second opening of the bag permitting readily opening and closing to allow emptying of the contents thereof without the harvester contacting said contents. Various opening and closing means may be employed for this purpose, but a hook-and-loop (Velcro®) closure, a zipper, or merely a cord strung through eyelets along the bottom of the bag container, among other possible means might be employed.

One embodiment of the bag container constructed of materials suitable for exposure to salt water comprising:

(a) a first opening to the bag container with a closure means that permits items to enter the container by said opening, but not exiting by said opening, which may be accomplished by having rigid partitions of a shape determined by the overall shape or area of the opening and attached along an edge of said opening and extending from said edge perpendicular to the central axis of the bag container wherein the partitions may move downward into the interior of the bag but not upward away from the interior of the bag, thereby permitting one-way insertion of a harvested marine species but preventing escape via said first opening; and (b) a second opening for discharging the contained marine species member comprising means for repeated secure closing and easy opening of the bag container.

The first opening could be of any suitable shape and size for permitting a harvested marine species member to be placed into the interior of the bag. Such size and shape may be determined by the targeted marine species. A generally circular opening, an oval-shaped opening, a square-shaped opening, a flared opening, or any other suitable to the intended use is envisioned for the invention bag container. In certain instances the opening may be formed by a flexible or a semi-rigid/semi-flexible material and take on multiple or undefined shapes. Also, the means for repeated secure closing and easy opening of the bag container may be one of a variety of choices. Optionally, one or more handles, tow lines, clips, other attachment means, and combinations thereof can be attached to or accompany a container such as a bag, in various embodiments of the present invention. A handle, for example, could be constructed of a rigid or non-rigid material such as hard plastic (rigid) or woven canvas (non-rigid) such as those employed on duffel bags.

Figure 4:
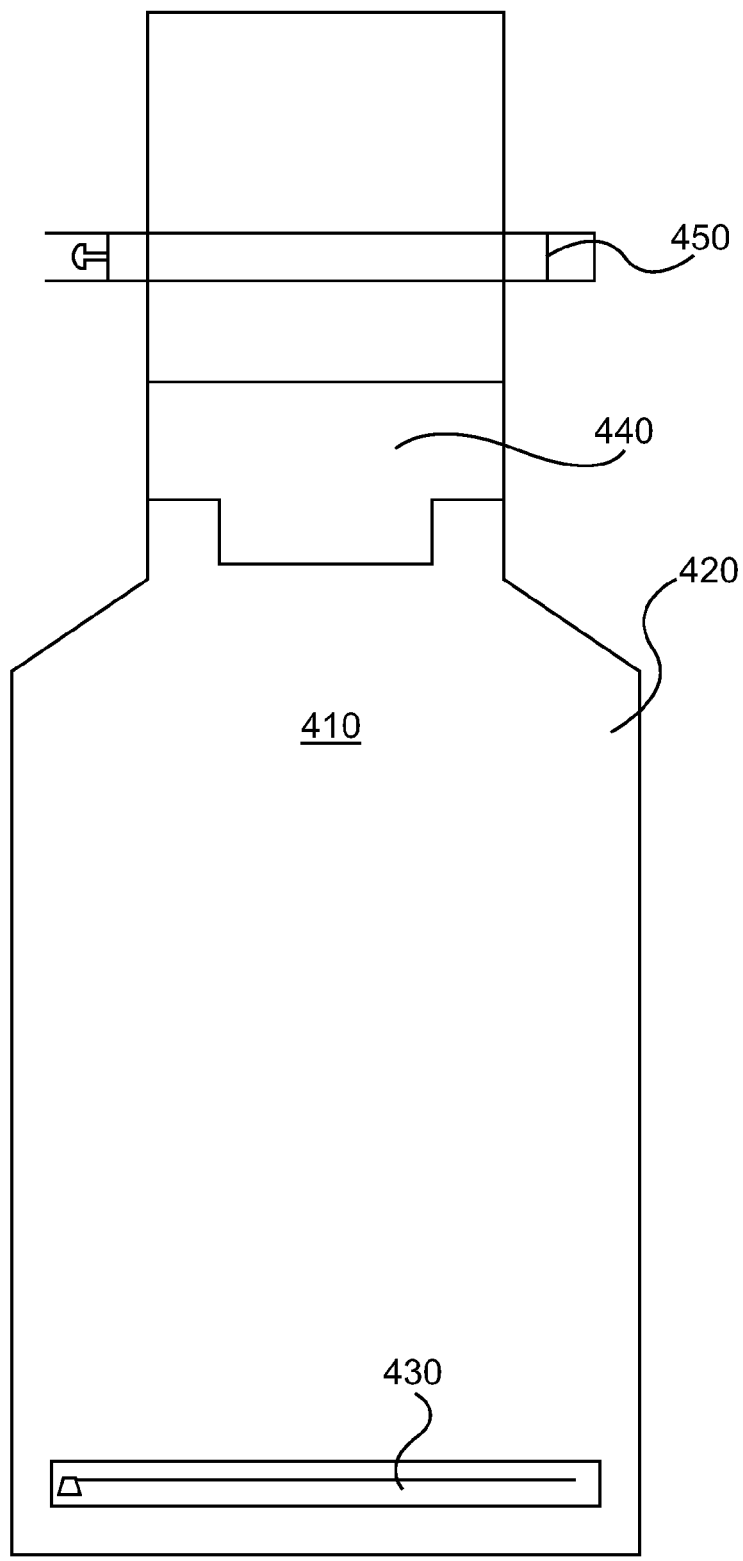
FIG. 4 represents another embodiment of a bag container that can be used to receive one or more harvested members of a marine species.

FIG. 4 depicts another embodiment of the container adapted to receive the impaled marine species member. In this embodiment, a bag 410 is formed of a clear plastic 420 having sufficient thickness to withstand accidental puncture from a spine when handling a harvested member. In some embodiments, the thickness ranges from about 5 mils to about 100 mils, or about 10 mils to about 50 mils. In some embodiments, the thickness is about 20 mils. In other embodiments, the thickness is at least about 1 micron, at least about 5 microns, at least about 10 microns, at least about 20 microns, at least about 50 microns, at least about 100 microns, at least about 500 microns, at least about 1000 microns, at least about 2000 microns, or at least about 3000 microns. The bag further comprises three closure mechanisms. The first is a water-resistant zipper 430 at or near the bottom of the bag. The second is a tongue trap 440 that facilitates removing the harvested member from the spear points and minimizes escape, such as those dive bag openings described in U.S. Pat. No. 4,498,190, which is incorporated herein by reference in its entirety. Tongue trap 440 comprises, in one embodiment, a ring of semi-rigid plastic having a "tongue" of the same material attached to the ring and positioned so that the tongue gives way to a force directed to the interior of the bag 410, but the tongue resists any force directed through the tongue trap 440 to the exterior of the bag 410. In this way, a harvested member can be pushed into the bag 410, but cannot escape through tongue trap 440. The third closure mechanism comprises a clip band 450 sewn onto the top end of the bag so that the top end can be rolled over several times and clipped closed with the clip band. Thus, the container of FIG. 4 is adapted to hold one or more harvested members of a marine species that presents a risk to the harvester, while preventing the harvested member from escaping and while reducing the flow of blood from the harvested member to the water outside the container. Reducing the flow of blood can reduce the attraction of other dangerous marine life such as barracudas and sharks, thereby minimizing somewhat that danger to the harvester. Thus, some embodiments of the present invention comprise a container comprising a first closure mechanism adapted to minimize the flow of blood from inside the container, a second closure mechanism adapted to minimize escape of a harvested member of a marine species, and a third closure mechanism adapted to minimize the flow of blood from the container through the second closure mechanism. In further embodiments, the first and third closure mechanisms are independently chosen from zippers, clip bands, hook-and-loop closures (Velcro®), buttons, snaps, drawstrings, ribbon ties, and combinations thereof. In some embodiments, the first and third closure mechanisms are adapted to allow some of the material of the container to roll or fold to further minimize the flow of blood from the container. The second closure mechanism also can be any suitable device, such as those set forth in U.S. Pat. No. 4,498,190, and FIGS. 3a and 3b, for example.

Figure 5:
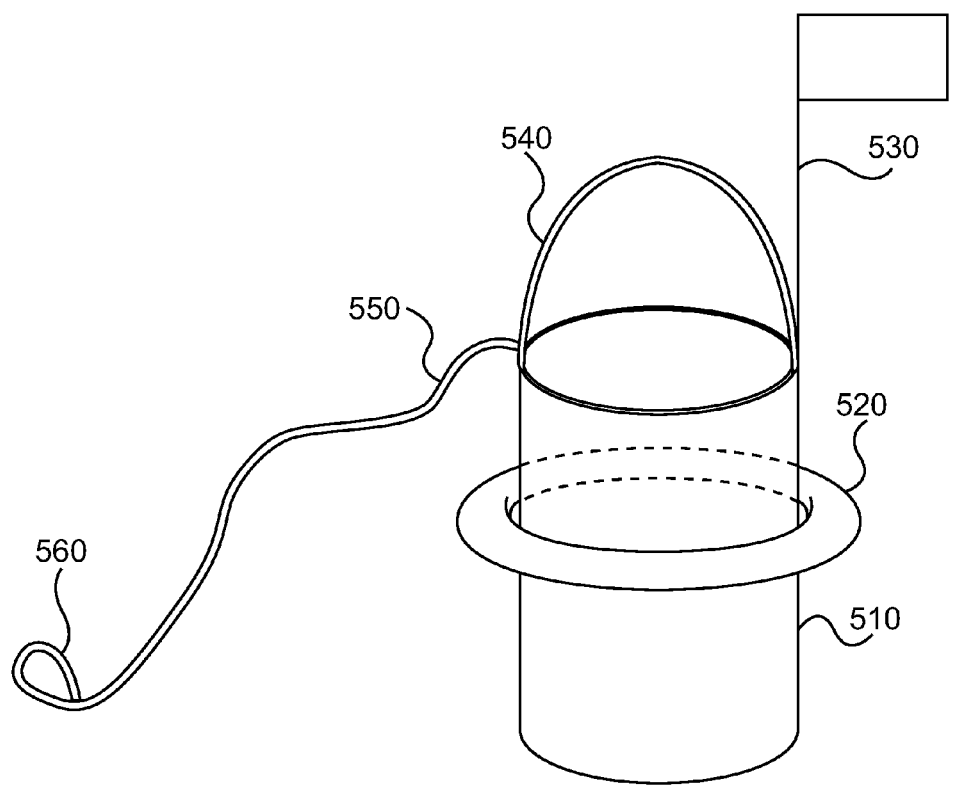
FIG. 5 presents an embodiment of a floating bucket container that can be used to receive harvested members of a marine species.

FIG. 5 depicts another embodiment of the container adapted to receive the impaled marine species member. In this embodiment, a bucket 510 or similar vessel is adapted with floats to add buoyancy. In the embodiment shown, an inflatable rubber inner tube 520 has been attached to the bucket 510. Any suitable flotation device or devices can be used, including foams such as polystyrene, and inflatable or inflated bladders containing air, nitrogen, or any suitable gas. The attachment between the bucket 510 and the inner tube 520 or other flotation device can be by any suitable means, such as friction, adhesive, tape, rope, screws, bolts, rivets, hook-and-loop (Velcro®), and combinations thereof. The bucket 510 or similar vessel can be any suitable device made of any suitable material. Plastics such as polyethylene, polypropylene, and polyvinyl chloride, among others, as well as aluminum, tin, steel, and other alloys, can be used. The bucket 510 in certain embodiments is a 5 gallon bucket. In some embodiments, the container further comprises a "diver down" flag 530 to signal boaters to use caution. The flag 530 can be attached in any suitable manner, such as, for example, by clipping, screwing, gluing, taping, or bolting to the bucket 510. The bucket 510 further comprises a wire handle 540. In further embodiments, one or more clips, loops, or ropes are adapted to allow the harvester to attach a tow line 550 to the container. The tow line 550, in some embodiments, attaches to the bucket 510 via a clip, such as stainless steel, copper, brass, bronze, plastic, and combinations thereof. The tow line 550 can be any suitable length, such as, for example, 10-20 feet in length, optionally wound on a reel (not shown) adapted to attach to a dive belt (not shown), and made from any suitable material, natural or synthetic. Cotton and nylon ropes are two examples. The tow line 550 ends in a loop 560 by which the harvester can tow the bucket 510. Optionally, the tow line could contain a clip, such as for attachment to a dive belt. A container having flotation devices attached offers several advantages. In some cases, a floating container minimized the blood flowing from the harvested member to the water outside the container. That minimizes the attraction of dangerous marine animals such as barracudas and sharks. Other potential advantages can be realized when the harvesting occurs near the surface. Assistants working from a boat or dock can remove the harvested members from the container while the harvester continues harvesting. Also, in those embodiments equipped with a "diver down" flag, the floating container offers additional safety from boaters for the harvester. Thus, in some embodiments, the invention comprises a container adapted to receive a harvested member of a marine species comprising a receiving vessel coupled to one or more flotation devices. In further embodiments, the receiving vessel further comprises a closure mechanism that prevents escape, such as those set forth in U.S. Pat. No. 4,498,190 and in FIGS. 3a and 3b. In those embodiments, the harvested members cannot flop their way to freedom.

Accordingly, further embodiments of the present invention comprise a system for harvesting a marine species member that presents a danger to a harvester from contact with the marine species member, wherein the system comprises a spear to impale the marine species member; and a means for removing said marine species member from the spear without direct contact between the harvester and the marine species member. The means for removing, in certain embodiments, comprises a shielding device coupled to the spear adapted to contact the impaled marine species member and to move the impaled marine species member off the spear. In some cases, the shielding device can comprise a plunger or a disc to contact and push the harvested member from the spear.

Additional embodiments provide such a system wherein the spear comprises a single spear point or multiple tines. Furthermore, in some cases, the spear comprises a single shielding device, or in other cases, multiple shielding devices. Combinations of single or multiple spear points or tines with one or more shielding devices are possible. Other embodiments provide a spear chosen from a polespear, a spear ejected from a spear gun, and a spear ejected from a Hawaiian sling.

The system of yet additional embodiments can be particularly adapted to harvest specific marine species. For example, the marine species member can be chosen from a crown-of-thorns starfish and a lionfish.

Yet further embodiments of the invention provide a system that comprises a container adapted to receive the impaled marine species member. In some instances, the container comprises a bag made from a woven material provided with a first opening comprising one or more retaining members flexibly attached to the first opening to permit movement only in the direction of the interior of the container to contain the harvested marine species member therein. In further instances, the container further comprises a second opening and a means for selectively opening and closing the second opening. Those means for selectively opening and closing the second opening are chosen from, for example, a hook-and-loop material closure, a zipper, a drawing cord, and a combination thereof.

Using the invention system for harvesting a member of a marine species that presents a danger to the harvester from contact with the marine species includes impaling the member, removing the member from the impaling device, and securing the removed member in a manner to prevent contact with the harvester during each step of using the system. Thus, another embodiment of the present invention relates to a method for harvesting a member of a marine species that presents a danger to the harvester comprising:

impaling the member on a spear comprising a shielding device;

removing the member from the spear using the shielding device. Further embodiments include securing the harvested member in a container adapted to receive the harvested member. In some cases, the container is adapted to prevent the harvested member from escaping, for example, by including a closure mechanism that prevents escape. In other cases, the container is adapted to reduce or eliminate the flow of blood from the harvested member to the water outside the container, for example, by including one or more closure mechanisms that are substantially water-resistant.

Thus, other additional embodiments include a container constructed of materials suitable for exposure to salt water comprising:
(a) a first opening to the container comprising a retaining means that permits entry of a marine species member into the container by said first opening but not exiting by said first opening; and
(b) a second opening for discharging the contained marine species member comprising a means for repeated selective opening of the second opening. In certain cases, the first opening is of a shape and size to permit passage of a harvested marine species member and has a shape chosen from a ring, a square, a polygon, an oval and an undefined shape, and the means for repeated selective opening of the second opening is chosen from a hook-and-loop closure material, a zipper, and a cord. Moreover, in other cases, the retaining means comprises multiple rigid partitions flexibly attached proximal to the opening wherein the multiple rigid partitions are adapted to flex toward the interior of the container but block the escape of a harvested marine species from the interior via the first opening. It is possible, in certain of those embodiments, that the container is adapted so that the marine species member enters the interior of the container impaled on a spear and the multiple rigid partitions are adapted to remove the marine species member from the spear.

Still further embodiments of the present invention provide a container for harvesting a member of a marine species comprising a first closure mechanism adapted to minimize the flow of blood from inside the container, a second closure mechanism adapted to minimize escape of a harvested member of a marine species, and a third closure mechanism adapted to minimize the flow of blood from the container through the second closure mechanism.

Additionally, embodiments may provide a container adapted to receive a harvested member of a marine species comprising a receiving vessel coupled to one or more flotation devices. Optionally, the receiving vessel further comprises a closure mechanism that prevents escape of the harvested member of a marine species.

Some embodiments of the present invention do not require the use of a spear with a shielding device. The use of a spear gun or Hawaiian sling and spear in the invention harvesting is effected by transfer of the impaled marine species member from the spear ejected from the spear gun or the Hawaiian sling into the bag container via the first opening (see FIGS. 3a, 3b, and 4), whereby the one-way closure feature of the first container operates to shield the harvester from contact with the species member and to force said member off the spear as the spear is withdrawn from the bag container.

Industrial Applicability

As can be appreciated, the manufacture and use of various embodiments of the present invention lend themselves to industrial applicability. Making the materials, fashioning the components, and finally assembling the spears, containers, and other devices represent manufacturing applicability. Using those spears, containers, and other devices to harvest marine species represents another application relating to ecological preservation and to developing food sources. The lionfish, for example, is edible and very tasty once the venomous spines are removed.

It is to be understood that the present invention is not intended to be limited to the above-mentioned embodiments, and hence various changes may be made without departing from the spirit and scope of the invention. The scope of the invention is, therefore, to be defined solely by the appended claims and consistent with the disclosure herein. Furthermore, the foregoing description of various embodiments does not necessarily imply exclusion. For example, "some" embodiments may include all or part of "other" and "further" embodiments within the scope of this invention.

What is claimed is:
1. A system for harvesting a marine species member comprising:
a spear comprising an end adapted to impale the marine species member, the spear comprising a hollow barrel having a slot formed therein along the hollow barrel, the hollow barrel having forward and rearward ends; and
means for removing said marine species member from the spear without direct contact between a harvester and the marine species member, wherein said means for removing comprises a plunger disposed in the hollow barrel, said plunger comprising:
a forward end adapted to contact the impaled marine species member and to move the impaled marine species member off the end of the spear, and
a rearward end coupled to a handle with fasteners extending through the slot along the hollow barrel, the handle surrounding an outer surface of the hollow barrel, the rearward end adapted for the harvester to operate the plunger with the handle;

a stabilizing guide positioned inside the forward end of the hollow barrel and adapted to stabilize the movement of the plunger, the plunger both extending through and being movably mounted within the stabilizing guide;

a plurality of tines attached to said stabilizing guide adjacent the forward end of the hollow barrel, wherein said plurality of tines extend outside the hollow barrel outwardly at an angle relative to an axis of the stabilizing member; and wherein movement of the handle along the slot toward the forward end of the hollow barrel permits a movement of the forward end of the plunger along the barrel, through the stabilizing guide, out of the barrel, and between the tines to push the impaled marine species member off of the tines thereby removing the marine species member from the spear without a direct contact between the marine species member and the harvester.

2. The system of claim 1 wherein the spear is chosen from a polespear, a spear ejected from a spear gun, and a spear ejected from a Hawaiian sling.

3. The system of claim 1, wherein the marine species member presents a danger to a harvester from contact with the marine species member.

4. The system of claim 3, wherein the marine species member is chosen from a crown-of-thorns starfish and a lionfish.

5. The system of claim 1 further comprising a container adapted to receive the impaled marine species member.

6. The system of claim 5 wherein the container comprises a bag made from a woven material provided with a first opening comprising one or more retaining members flexibly attached to the first opening to permit movement only in the direction of the interior of the container to contain the harvested marine species member therein.

7. The system of claim 6 wherein the container further comprises a second opening and means for selectively opening and closing the second opening.

8. The system of claim 7 wherein the means for selectively opening and closing the second opening is chosen from a hook-and-loop material closure, a zipper, a drawing cord, and a combination thereof.

9. The system of claim 1, further comprising an elastic material adapted to allow the harvester to launch and retain the spear.

10. The system of claim 1, wherein the hollow tube comprises aluminum.

* * * * *